US012595211B2

(12) United States Patent
Hartwich

(10) Patent No.: US 12,595,211 B2
(45) Date of Patent: Apr. 7, 2026

(54) REFRACTORY LINING DESIGN AND SEPARATION VIA DESTRUCTIVE HYDRATION

(71) Applicant: HarbisonWalker International, Inc., Moon Township, PA (US)

(72) Inventor: David Hartwich, Bethel Park, PA (US)

(73) Assignee: HarbisonWalker International, Inc., Moon Township, PA (US)

( * ) Notice: Subject to any disclaimer, the term of this patent is extended or adjusted under 35 U.S.C. 154(b) by 750 days.

(21) Appl. No.: 17/968,054

(22) Filed: Oct. 18, 2022

(65) Prior Publication Data

US 2023/0212078 A1 Jul. 6, 2023

Related U.S. Application Data

(60) Provisional application No. 63/296,912, filed on Jan. 6, 2022.

(51) Int. Cl.
*C04B 35/04* (2006.01)
*B02C 23/16* (2006.01)
(Continued)

(52) U.S. Cl.
CPC .............. *C04B 35/04* (2013.01); *B02C 23/16* (2013.01); *C04B 14/304* (2013.01); *C04B 35/043* (2013.01); *C04B 35/62204* (2013.01); *F27D 1/0006* (2013.01); *C04B 2235/3206* (2013.01); *C04B 2235/3821* (2013.01); *C04B 2235/424* (2013.01); *C04B 2235/425* (2013.01);
(Continued)

(58) Field of Classification Search
CPC ..... C04B 35/04; C04B 14/304; C04B 35/043; B02C 23/16
USPC ............................................................ 209/3
See application file for complete search history.

(56) References Cited

U.S. PATENT DOCUMENTS 5,470,559 A * 11/1995 Grolman ................... C25C 3/08
423/489
5,935,317 A * 8/1999 Soroushian ......... C04B 40/0231
106/819
(Continued)

FOREIGN PATENT DOCUMENTS

CN 203409790 U * 1/2014
CN 110511047 A * 11/2019 ....... C04B 35/62204
(Continued)

OTHER PUBLICATIONS

Website https://cordis.europa.eu/project/id/603809/reporting, Vlaamse Instelling Voor Tecnologisch Onderzoek N.V., *Innovation Separation Technologies for High Grade Recycling of Refractory Waste using non destructive technologies*, Feb. 8, 2017.
(Continued)

*Primary Examiner* — Terrell H Matthews
(74) *Attorney, Agent, or Firm* — RENNER, OTTO, BOISSELLE & SKLAR, LLP

(57) ABSTRACT

A method of separating a mixture of used refractory components of different chemistry types obtained from a demolished refractory includes hydrating the mixture of refractory components to destructively hydrate at least some components of the mixture of refractory components, and separating, based on size, the at least some components from other components of the mixture of refractory components.

23 Claims, 3 Drawing Sheets

(51) Int. Cl.

| | | |
|---|---|---|
| *C04B 14/30* | (2006.01) | |
| *C04B 35/043* | (2006.01) | |
| *C04B 35/622* | (2006.01) | |
| *F27D 1/00* | (2006.01) | |
| *F27D 25/00* | (2010.01) | |

(52) U.S. Cl.

CPC ................ *C04B 2235/9607* (2013.01); *C04B 2235/9676* (2013.01); *F27D 2001/0046* (2013.01); *F27D 25/00* (2013.01)

(56) References Cited

U.S. PATENT DOCUMENTS

| | | | |
|---|---|---|---|
| 2011/0045962 A1* | 2/2011 | Ruiz De Veye | .... C22B 21/0046 |
| | | | 501/151 |
| 2012/0002176 A1 | 1/2012 | Hirosawa et al. | |
| 2020/0087214 A1 | 3/2020 | Debastiani et al. | |
| 2021/0269366 A1 | 9/2021 | Garnier et al. | |

FOREIGN PATENT DOCUMENTS

| | | | | | |
|---|---|---|---|---|---|
| CN | 113800929 | A | 12/2021 | | |
| CN | 218034086 | U * | 12/2022 | | |
| EP | 4357317 | A1 * | 4/2024 | ....... | C04B 35/62675 |
| RU | 2740887 | C2 * | 1/2021 | ............ | B07B 15/00 |
| WO | WO-2021/144386 | A1 | 7/2021 | | |

OTHER PUBLICATIONS

Boenzi F., https:/doi.org/10.1007/s13762-021-03553-2, "*Possible ecological advantages from use of carbonless magnesia refractory bricks in secondary steelmaking: a framework LCA perspective,*" International Journal of Environmental Science and Technology, Jul. 12, 2021.

International Search Report and Written Opinion issued in corresponding International Application No. PCT/US2022/053776 dated Apr. 17, 2023.

Horckmans, et al, "Recycling of refractory bricks used in basic steelmaking: A review", *Resources, Conservation & Recycling*, vol. 140 (2019), pp. 297-304.

* cited by examiner

REFRACTORY LINING DESIGN AND SEPARATION VIA DESTRUCTIVE HYDRATION

RELATED APPLICATIONS

This application claims the benefit of U.S. Provisional Application No. 63/296,912 filed Jan. 6, 2022, which is hereby fully incorporated herein by reference.

FIELD OF THE INVENTION

The present invention relates generally to refractory linings, and more particularly, to a refractory lining design and method for producing reclaimed low-impurity Magnesia-Carbon aggregate from a refractory lining having said design.

BACKGROUND OF THE INVENTION

Magnesia-Carbon bricks are broadly used for the lining construction of metallurgical vessels, which are used to produce or refine metals, such as steel. Magnesia-Carbon bricks are the dominant linings in basic oxygen furnaces (BOF), electric arc furnaces (EAF), ladle metallurgical furnaces (LMF) and steel teeming or steel transfer ladles. Key useful characteristics of Magnesia-Carbon bricks include high refractoriness and high corrosion resistance against basic, typically calcium rich slags.

After a refractory lining reaches the end of its service life, the lining of the metallurgical vessel is demolished, the metallurgical vessel is cleaned or repaired and subsequently relined with new Magnesia-Carbon brick linings. The demolished lining contains chemical mixtures of high-quality refractory components that act as impurities to one another, and it can be difficult to remove/separate these impurities when recycling the refractory components that formed the lining. The demolished used lining is either disposed or subjected to one of the common reclaiming processes.

It is estimated that the total volume of demolished Magnesia-Carbon linings available is about 3 to 5 lbs. per ton of steel produced. This is a large volume of material that, if not reclaimed and improved, has limited value. Further, since Magnesium Oxide (MgO) hydrates and disintegrates over time, Magnesia-Carbon bricks are not easily recyclable into roadway aggregate or other secondary construction applications in the same way that alumina-containing materials, or other non-hydratable refractory materials or slags, can be recycled. While Magnesia-Carbon bricks can be recycled, all of the known beneficiation methods have significant limitations with regard to the final properties of the reclaimed aggregate, the yield of the useable aggregate, or the high cost of the useable aggregate compared to costs of virgin ingredients used for the production of Magnesia-Carbon brick.

Reclaiming used Magnesia-Carbon bricks from steel applications for use in high quality refractory products is difficult due to the contamination that can arise from a number of factors. One such contamination can be due to different refractory compositions (Alumina-Magnesia-Carbon (AMC) brick, Magnesia-Alumina-Carbon (MAC) brick, Dolomite brick, Non-Magnesia Castables or Shotcretes, Alumina, or Alumina-Silica, or Olivine materials, or Dolomitic based backfill that are used throughout the Steel vessel; and to a highly variable magnesia brick and monolithic compositions in EAF furnaces. An example of this contamination was shown after grinding reclaimed bricks, where samples of reclaimed material averaged 69.5% MgO and 23.2% $Al_2O_3$, which implies a high amount of AMC brick contamination that disqualifies the reclaimed material from being used as Magnesia-Carbon bats or recycle. Another form of contamination can be due to incompatible backfill adherence and metallurgical slag adherence to the remnant Magnesia-Carbon brick. An example of this contamination was observed in the sorted reclaimed material, where it was found the contamination being 12% from Alumina-Silica containing backup lining and 5% from calcium rich slag. The metal carbides found in many typical Magnesia-Carbon brick, which are the target of reclaim efforts, act as contaminants themselves.

The metal carbides are typically generated during the high temperature service. In this regard, it has been found that the chemistry of the sized and sorted reclaimed material obtained after a passivation process of metal carbides is much lower in Magnesia content than the original refractory products. Other sources of contamination were found to be due to metal adhering to remnant Magnesia-Carbon brick. These contaminants significantly limit the further use of the reclaimed aggregate and excludes the viability for use in any Magnesia-Carbon brick products.

SUMMARY OF THE INVENTION

The present invention provides a method for recycling refractory materials using destructive hydration. More particularly, refractory linings are selectively constructed using materials that, after service, have known destructive hydration behavior. After mixed tear-out of the linings, the recovered materials undergo a hydrotreatment and screening process to separate and recycle the materials into high quality refractory materials.

According to one aspect of the invention, a method of separating a mixture of used refractory components of different chemistry types, the used refractory components obtained from a demolished refractory is disclosed. The method includes: hydrating the mixture of refractory components to destructively hydrate at least some components of the mixture of refractory components; and separating, based on size, the at least some components from other components of the mixture of refractory components.

In one embodiment, separating includes using at least one of a screen mesh or an air classifier to separate the at least some components from the other components.

In one embodiment, the method further includes retaining the other components for further processing and discarding the at least some components.

In one embodiment, the method further includes discarding components of the mixture of components that are smaller than a predetermined size.

In one embodiment, hydrating includes at least one of placing the mixture of refractory components in a dryer with an oversaturated humidity to accelerate hydration of the mixture of refractory components, or soaking the mixture of refractory components in a liquid to produce a wet mixture of refractory components, and placing the wet mixture of refractory components in the dryer to accelerate hydration and cause the wet mixture of refractory components to destructively hydrate into aggregates.

In one embodiment, placing the mixture of refractory components in a dryer includes using one of a rotary dryer, a fluidized bed dryer, a humidity-controlled batch dryer or humidity and pressure controlled autoclave.

In one embodiment, the at least some components includes hydrated slag dust.

In one embodiment, the steps of hydrating and separating are iteratively performed.

In one embodiment, separating includes screening the hydrated mixture to separate the at least some components into a first group and the other components into a second group, where a size of each component in the second group is larger than a size of each component in the first group.

In one embodiment, the method further includes: hydrating the components of the second group to destructively hydrate the components of the second group into at least some additional components; and separating, based on size, the at least some additional components from other additional components of the components of the second group.

In one embodiment, wherein separating the at least some additional components includes screening using a screen mesh or an air classifier to separate the at least some additional components from the other additional components.

In one embodiment, hydrating the components of the second group includes soaking the components of the second group in a liquid to produce wet components, and placing the wet components in the dryer to accelerate hydration and cause the wet components to destructively hydrate into aggregates that are smaller in size than the wet components.

In one embodiment, accelerating hydration includes accelerating hydration of some of the components containing at least one of Aluminum Carbide, Al, Mg, MgAl or Lime.

In one embodiment, soaking includes soaking the components of the second group in water.

In one embodiment, the refractory components includes a mixture of at least two of hydratable slag, Dolomite, Magnesia-Carbon, Alumina-Magnesia-Carbon pieces and Magnesia-Alumina Carbon pieces.

In one embodiment, separating includes separating hydratable slag from the carbon-bonded refractory components.

In one embodiment, the method further includes demolishing a refractory to obtain the mixture of used refractory components.

In one embodiment, the refractory includes a barrel region formed from a first refractory component and a slag-line region formed from a second refractory component, the second refractory material different from the first refractory material.

In one embodiment, the at least one of refractory components includes a hydration inhibitor including at least one of $Si_+B_4C$, Si metal or $B_4C$.

In one embodiment, the at least some components include calcium aluminate-type slag.

In one embodiment, the calcium aluminate-type slag includes hydratable phases of calcium aluminates.

In one embodiment, the calcium aluminate-type slag includes CaO greater than 40% by weight, and a $CaO:Al_2O_3$ ratio is greater than 0.94 by weight.

According to another aspect of the invention, a method of recycling refractory components includes: constructing a liner for a metallurgical vessel, the liner formed from at least two different carbon-bonded refractory components, wherein the at least two different carbon-bonded refractory components are selected based on hydration characteristics of the carbon-bonded refractory components; demolishing the liner to produce a mixture of carbon-bonded refractory components of different chemistry types; destructively hydrating the mixture of carbon-bonded refractory components to produce components of reduced size; and separating the components of reduced sized into at least two groups based on the relative size of the components.

In one embodiment, at least one of the two different carbon-bonded refractory components contain Boron Carbide (B4C).

Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well-known process operations have not been described in details so as to not unnecessarily obscure the present invention.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Various aspects of the invention now will be described more fully hereinafter. Such aspects, however, may be embodied in many different forms and should not be construed as limited to the embodiments set forth herein; rather, these embodiments are provided so that this disclosure will be thorough and complete, and will fully convey its scope to those skilled in the art.

The word "about" when immediately preceding a numerical value means a range of plus or minus 10% of that value, e.g., "about 50" means 45 to 55, "about 25,000" means 22,500 to 27.500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

As used herein, the term "refractory material" refers to inorganic nonmetal materials utilized in various high-temperature equipment, e.g., steel production, other metal production, non-metal production, glass, cement, lime, chemical, gas, energy production and the like. Refractory materials are characterized by a high melting point, and when exposed to high temperatures they retain some of their strength and retain their form.

Figure 1:
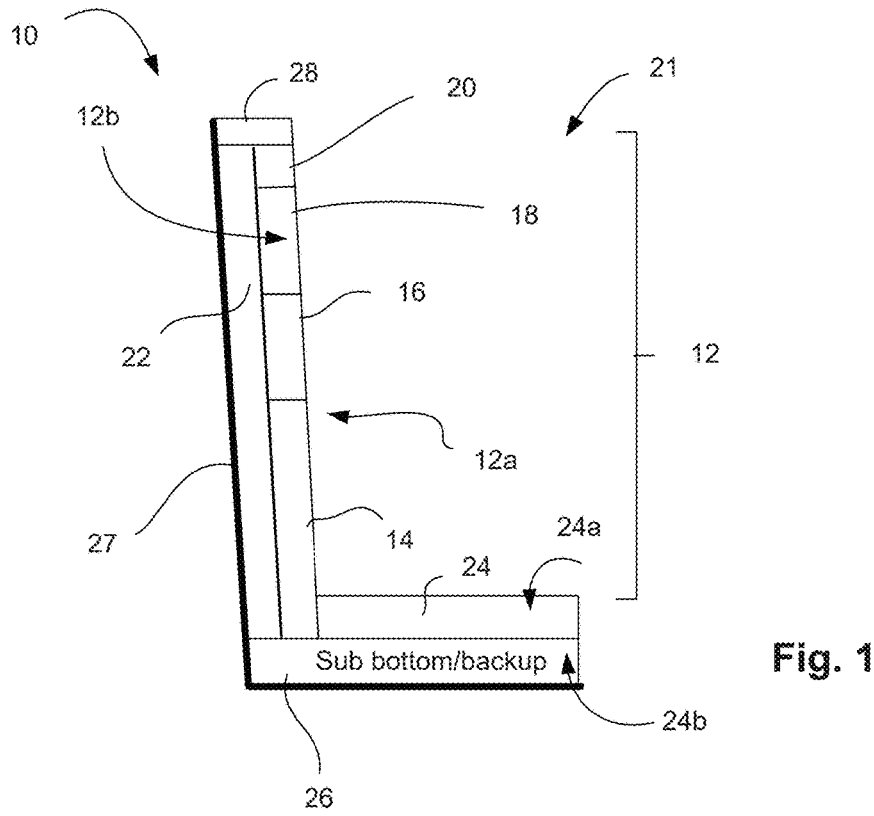
FIG. 1 is a schematic diagram of a conventional refractory vessel.

Referring to FIG. 1, illustrated is an exemplary lining construction for a metallurgical vessel 10 used to produce or refine metals. The lining construction includes a working lining 12 having a barrel region 14, a lower slag line region 16, an upper slag line region 18 and a freeboard region 20. As shown in FIG. 1, the lower slag line region 16 is between the barrel region 14 and the upper slag line region 18, and the upper slag line region 18 is between the lower slag line region 16 and the freeboard region 20. The working lining 12 has a first working lining side 12a and a second working lining side 12b opposite the first working lining side 12a, where the first working lining side 12a faces an inner molten-metal and molten slag holding region 21 of the metallurgical vessel 10. The lining construction further includes a backup lining 22 formed from one or more of Magnesium Oxide-based brick, or Aluminum Oxide-based brick, either burned or resin bonded, or Aluminum Oxide-based brick or monolithic.

The lining construction further includes a bottom lining 24 arranged adjacent to the barrel region 14. The bottom lining 24 is formed, for example, from Aluminum Oxide based refractory and includes a first bottom lining side 24a and a second bottom lining side 24b opposite the first bottom lining side 24a, where the first bottom lining side 24a faces the inner molten-metal holding region 21. A sub-bottom lining 26 is formed, for example, also from Aluminum Oxide based refractory and is disposed under and in contact with the second bottom lining side 24b. As can be seen in FIG. 1, the sub-bottom lining 26 is arranged under the backup lining 22 and working lining 12 such that the sub-bottom lining 26 is in contact with a bottom portion of the barrel region 14 and a bottom portion of the backup lining 22, i.e., the sub-bottom lining 26 supports the working lining 12, the backup lining 22 and the bottom lining 24. Such bottom construction is typically referred as Plug bottom. Alternatively, the bottom lining 24 could be installed over sub-bottom lining 26 after the back-up lining 22 is constructed and prior to the installation of working lining 12. Such bottom construction is referred as Full bottom. Arranged along a top portion of the lining construction is a flange 28 (also referred to as a lip ring), the flange 28 being distal from the bottom lining 24 and adjacent to a top edge surface of the working lining 12 (in particular the freeboard 20) and the backup lining 22. The sub-bottom lining 26 and backup lining 22 are supported by a steel structure 27 that defines the outer dimensions of the vessel.

Figure 2:
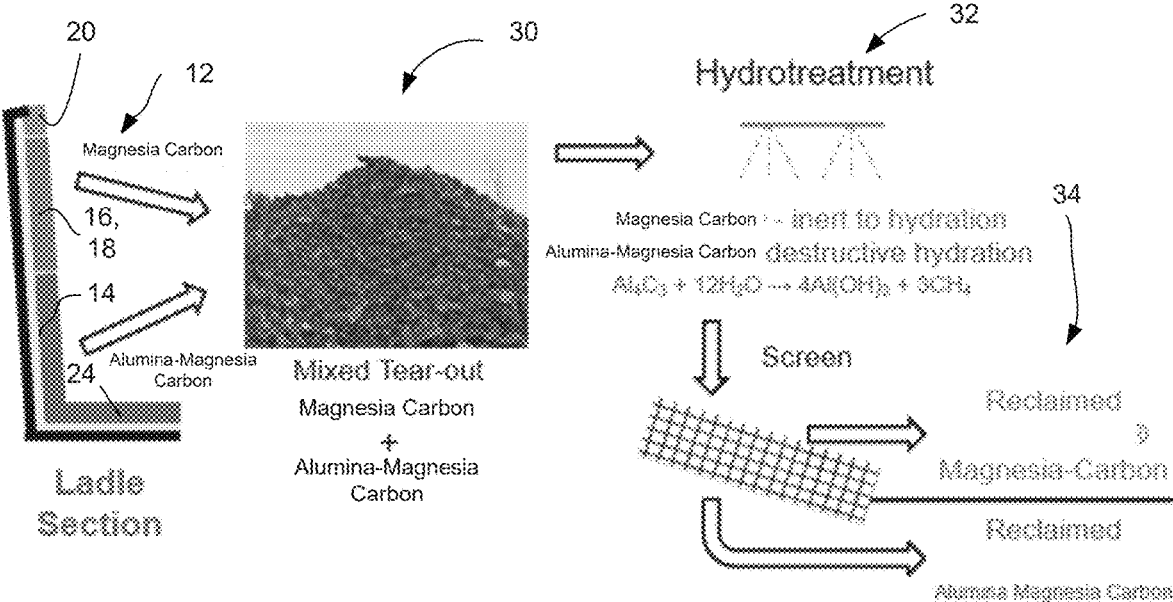
FIG. 2 is a high-level flow diagram illustrating a method of reclaiming refractory components from a demolished refractory vessel in accordance with the invention.

Referring to FIG. 2, a method in accordance with the present invention enables a used working lining 12 of a vessel to be reclaimed without contamination from other refractory sources. In accordance with the invention, the components that form the working lining 12 of the vessel (i.e., the lining that in normal use is in contact with molten metal or molten slag) are specifically selected based on their hydration characteristics. More particularly, the components of the lining are selected such that components from one portion of the lining (e.g., the barrel region 14 and/or bottom lining 24) destructively hydrate to a different degree than another portion of the lining (e.g., the lower and/or upper slag line region 16, 18, the freeboard region 20). For example, the barrel region of the lining may be formed from a carbon-bonded alumina magnesia brick (which does destructively hydrate) and slag line region may be formed from a carbon-bonded Magnesium Oxide brick (which does not destructively hydrate).

Once the lining has reached the end of its service life, the lining is demolished, which produces a mixture of components 30 (e.g., brick components and an easily hydratable slag). The mixture of components 30 is subjected to a hydration process 32 where the components destructively hydrate and break into pieces. In this regard, the components may be processed through a rotary dryer with high humidity to accelerate hydration of the oversaturated slag with lime, thereby causing the slag to destructively hydrate into dust along with various sizes of brick components. The pieces then can be separated into groups 34 based on size (e.g., brick chunks are separated from hydrated slag dust), where components smaller that a predetermined size may be discarded. The remaining refractory brick chunks may then be soaked in water and again processed through the rotary dryer to accelerate hydration of the Aluminum Carbide (or other selected component) of the barrel region brick and preferably cause these brick chunks to destructively hydrate into small aggregates. The components may again be screened to separate un-hydrated carbon-bonded Magnesium Oxide brick chunks from hydrated (passivated) carbon-bonded Alumina Magnesia aggregate.

The hydration and sorting steps may be repeated over several iterations to achieve a good separation of the different components. The components in one or more of the separated groups then can be used to form a new aggregate for refractory materials.

Figure 3:
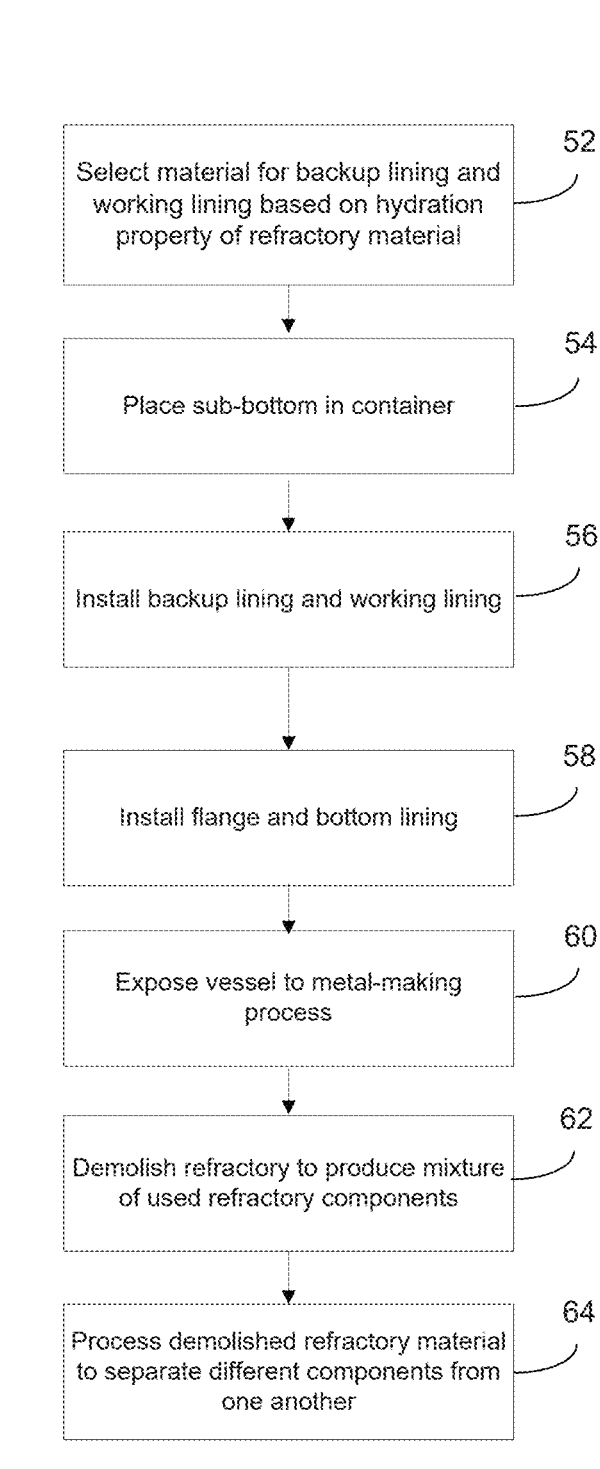
FIG. 3 is a flow chart showing steps of constructing a refractory lining and reclaiming refractory components from the lining in accordance with the invention.

Referring to FIG. 3, illustrated are exemplary steps of a method 50 for constructing a liner of a refractory vessel (e.g., a Steel ladle, EAF furnace, etc.) using at least two different carbon-bonded refractory components, where the liner construction facilitates reclamation of refractory material after the liner has reached the end of its service life. Beginning at step 52, components for the working lining (including the barrel region 14, lower slag line 16, upper slag line 18, freeboard region 20) are selected based on hydration characteristics of the components. In this regard, knowledge of what components hydrate more readily and more destructively than others is used to design the liner. For example, the barrel region 14 can be formed from components having a first hydration property, the lower slag region 16 can be formed from components having a second hydration property, and the upper slag region 18 can be formed from components having a third hydration property, where the first, second and third hydration properties are different from each other.

Table 1 illustrates compositions of additives in order of how hydratable each composition is relative to the other compositions (the top compositions being the most hydratable and the bottom compositions being the least hydratable).

TABLE 1

| | Compositional Additives |
| --- | --- |
| 1 | Al |
| 2 | Al + Si |
| 3 | Al + B4C |
| 4 | Al + Si + B4C |

TABLE 1-continued

| | Compositional Additives |
|---|---|
| 5 | Al + MgAl + B4C |
| 6 | No metal & No antioxidant |
| 7 | Si |
| 8 | B4C |

By selecting materials for each lining part and/or each lining region based on hydration properties, the materials can be more-easily separated from one another once the lining has reached the end of its service life and is torn out. More particularly, after lining tear-out a hydrotreatment and screening process is implemented on the mixture of materials to allow for the separation of each material into proper chemical categories. The resulting separated materials are contamination free (low impurity) that can be recycled into high quality refractory products. Further details of the hydration and separation process are discussed below with respect to FIG. 4.

Once the components for each region have been selected, at step 54 the refractory is assembled by placing a sub-bottom 26 within a container structure 27. Next at step 56, a backup lining 22 is arranged within the steel shell 27 of the refractory vessel to define an outer-most surface of the backup lining 22 and a working lining 12 is formed adjacent to the backup lining 22, the working lining 12 then defining an inner-most wall 12a of the metallurgical vessel 10.

Next at step 58 the flange (lip ring) 28 is installed over the backup lining 22 and working lining 12, the flange 28 defining a top surface of the vessel. The flange 28 can be formed from Alumina-based castable or ram. Additionally, the bottom lining 24 is installed over the sub-bottom 26 (i.e., a plug bottom) or over sub-bottom lining 26 after the back-up lining 22 is constructed and prior to the installation of the working lining 12 (i.e., a full bottom).

Next at step 60 the assembled refractory is placed into service, thereby exposing the working lining 12 to a high-temperature process. Once the refractory has reached a point in which it requires repair, the working lining 12 is prepared for tear out and is demolished as indicated at step 62 to produce a mixture of used carbon-bonded refractory components of different chemistry types. At step 64 the mixture of components are destructively hydrated to produce components of reduced size, and then separated into groups of components of different sizes, thereby enabling certain desirable components to be reclaimed. Further details concerning the separation process are discussed below with respect to FIG. 4.

Figure 4:
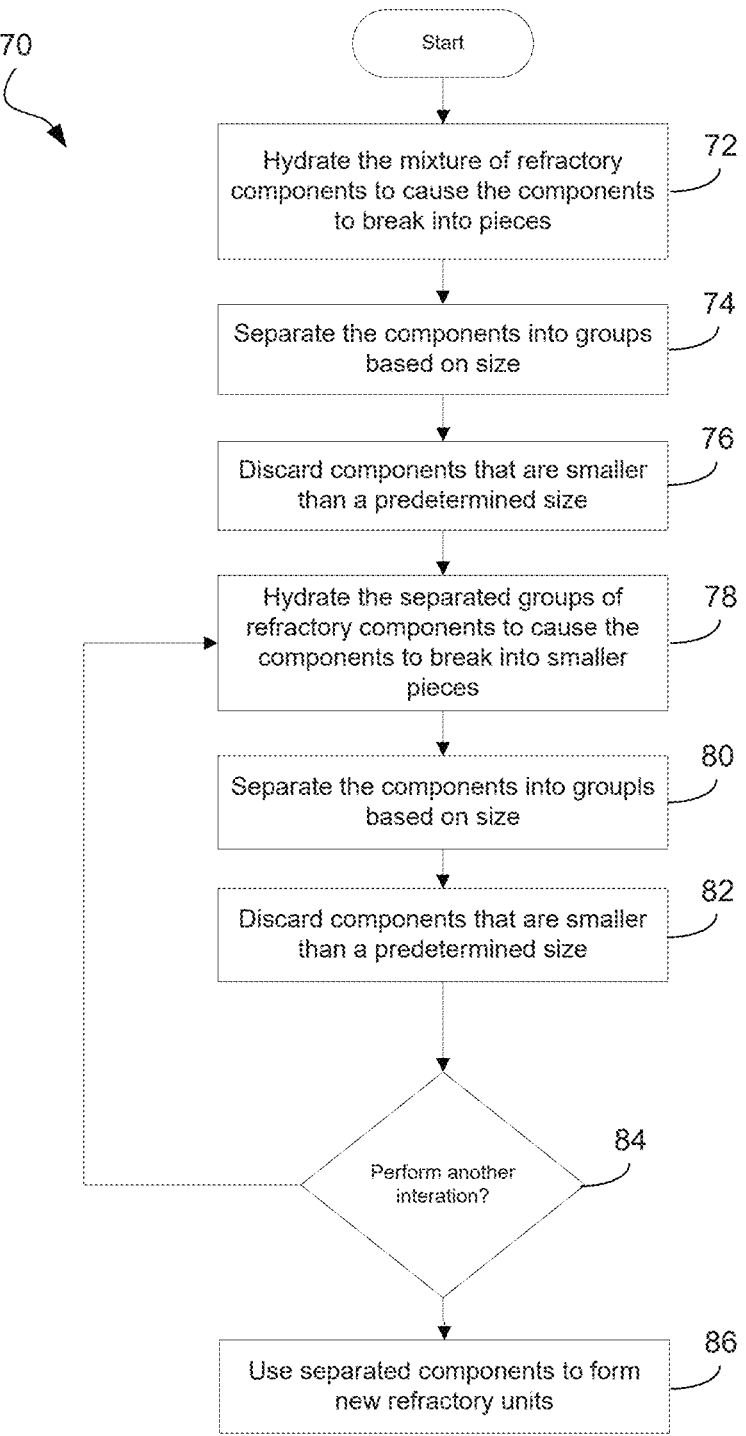
FIG. 4 is a flow chart showing steps of destructively hydrating components of demolished refractory lining and separating the components from one another in accordance with the invention.

Moving now to FIG. 4, illustrated are steps of a method 70 of separating a mixture of used refractory components of different chemistry types obtained from a demolished refractory of the type described herein and specifically to a refectory formed based on the method of FIG. 3. The mixture of components may include at least two of hydratable slag, Dolomite, Magnesia-Carbon, Alumina-Magnesia-Carbon and Magnesia-Alumina-Carbon pieces. Beginning at step 72, the mixture of refractory components are hydrated to destructively hydrate at least some components of the mixture of refractory components into smaller pieces. The components may be hydrated in any one of a number of different methods. For example, the mixture of refractory components may be placed in a dryer at a specified temperature, e.g., 230 degrees F.) with a specified relative humidity, e.g., a relative humidity of at least 17% at dew-point 150 degrees F. to accelerate hydration of the mixture of refractory components. It is noted that humidity may vary based on the dew point (relative humidity will have a different value at different temperatures and dew points). As such, instead of reference of to "relative humidity" another way of considering the hydration parameters is in terms of the oversaturated humidity at set temperature. Alternatively, the mixture of refractory components may be soaked in a liquid, e.g., water, to produce a wet mixture of refractory components. The wet mixture of refractory components then is placed in the dryer to accelerate hydration and cause the wet mixture of refractory components to destructively hydrate into aggregates. The dryer may be any one of a rotary dryer, a fluidized bed dryer, a humidity-controlled batch dryer or humidity or a pressure-controlled autoclave. Acceleration of the hydration process may be targeted at components that include one or more of Aluminum Carbide, Al, Mg, MgAl or Lime.

Upon the components are destructively hydrated, they are separated from one another based on size as indicated at step 74. For example, components larger than a first predetermined size may be placed in a first group, and components smaller than the first predetermined size may be placed in a second group. To separate the components, a screen mesh may be utilized to separate large components from small components. Alternatively or additionally, an air classifier may be utilized to separate the some components from other components. Components smaller that a second predetermined size (i.e., a size smaller than the first predetermined size), such as hydrated slag dust, which may include lime oversaturated calcium aluminate-type slag (e.g., CaO greater than 40% by weight, where a $CaO:Al_2O_3$ ratio is greater than 0.94 by weight) and/or hydratable phases of calcium aluminates that have been separated from the refractory components, may be discarded, as indicated at step 76.

A second iteration of the hydration and separating steps may be performed to further refine the purity of the respective groups of components. More particularly, at step 78 one or more of the separated groups of components may be again hydrated to destructively hydrate the components into additional components and thus cause the components to break into smaller pieces. As in the previous hydration step, the components may be soaked in a liquid to produce wet components and the wet components placed in the dryer to accelerate hydration and cause the wet components to destructively hydrate into aggregates that are smaller in size than the wet components. Next at step 80 the components are again separated based on size using the aforementioned separation techniques (e.g., screening using a screen mesh or an air classifier), and at step 82 components smaller than a predetermined size are discarded. Steps 78-82 then may be iteratively performed as needed to further refine the components, as indicated at step 84. The components that are not discarded then can be retained for further processing to produce contaminant-free components that can be used to produce new refractory units, as indicated at step 86.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A method of recycling refractory components, comprising:

constructing a liner for a metallurgical vessel, the liner formed from at least two different carbon-bonded refractory components, wherein the at least two different carbon-bonded refractory components are selected based on hydration characteristics of the carbon-bonded refractory components;

demolishing the liner to produce a mixture of carbon-bonded refractory components of different chemistry types;

destructively hydrating the mixture of carbon-bonded refractory components to produce components of reduced size; and separating the components of reduced size into at least two groups based on the relative size of the components.

2. The method according to claim 1, wherein separating comprises using at least one of a screen mesh or an air classifier to separate the at least some components from the other components.

3. The method according to claim 1, further comprising retaining at least one of the two groups of components for further processing and discarding the other of the at least two groups of components.

4. The method according to claim 1, further comprising discarding components of the mixture of carbon-bonded refractory components that are smaller than a predetermined size.

5. The method according to claim 1, wherein destructively hydrating comprises at least one of placing the mixture of carbon-bonded refractory components in a dryer with an oversaturated humidity to accelerate hydration of the mixture of carbon-bonded refractory components, or soaking the mixture of carbon-bonded refractory components in a liquid to produce a wet mixture of refractory components, and placing the wet mixture of refractory components in the dryer to accelerate hydration and cause the wet mixture of refractory components to destructively hydrate into aggregates.

6. The method according to claim 5, wherein placing the wet mixture of refractory components in a dryer comprises using one of a rotary dryer, a fluidized bed dryer, a humidity-controlled batch dryer or humidity and pressure controlled autoclave.

7. The method according to claim 1, wherein at least some of the components of reduced size comprise hydrated slag dust.

8. The method according to claim 1, wherein the steps of destructively hydrating and separating are iteratively performed.

9. The method according to claim 1, wherein separating comprises screening the components of reduced size to separate at least some components into a first group and other components into a second group, where a size of each component in the second group is larger than a size of each component in the first group.

10. The method according to claim 9, further comprising: hydrating the components of the second group to destructively hydrate the components of the second group into at least some additional components; and separating, based on size, the at least some additional components from other additional components of the components of the second group.

11. The method according to claim 10, wherein separating the at least some additional components comprises screening using a screen mesh or an air classifier to separate the at least some additional components from the other additional components.

12. The method according to claim 10, wherein hydrating the components of the second group comprises soaking the components of the second group in a liquid to produce wet components, and placing the wet components in a dryer to accelerate hydration and cause the wet components to destructively hydrate into aggregates that are smaller in size than the wet components.

13. The method according to claim 1, wherein accelerating hydration includes accelerating hydration of some of the components containing at least one of Aluminum Carbide, Al, Mg, MgAl or Lime.

14. The method according to claim 12, wherein soaking comprising soaking the components of the second group in water.

15. The method according to claim 1, wherein the refractory components comprise a mixture of at least two of hydratable slag, Dolomite, Magnesia-Carbon, Alumina-Magnesia-Carbon pieces and Magnesia-Alumina Carbon pieces.

16. The method according to claim 1, wherein separating comprises separating hydratable slag from the carbon-bonded refractory components.

17. The method according to claim 1, wherein the liner comprises a barrel region formed from a first refractory component and a slag-line region formed from a second refractory component, the second refractory component different from the first refractory component.

18. The method according to claim 1, wherein at least one refractory component of the carbon-bonded refractory components comprises a hydration inhibitor including at least one of $Si_xB_4C$, Si metal or $B_4C$.

19. The method according to claim 1, wherein at least some of the components of reduced size comprise calcium aluminate-type slag.

20. The method according to claim 19, wherein the calcium aluminate-type slag comprises hydratable phases of calcium aluminates.

21. The method according to claim 19, wherein the calcium aluminate-type slag comprises CaO greater than 40% by weight, and a $CaO:Al_2O_3$ ratio is greater than 0.94 by weight.

22. The method according to claim 1, wherein at least one of the two different carbon-bonded refractory components contain Boron Carbide (B4C).

23. A method of separating a mixture of used refractory components of different chemistry types, the used refractory components obtained from a demolished refractory liner constructed from at least two different carbon-bonded refractory components, wherein the at least two different carbon-bonded refractory components are selected based on hydration characteristics of the carbon-bonded refractory components, the method comprising:

hydrating the mixture of refractory components to destructively hydrate at least some components of the mixture of refractory components; and separating, based on size, the at least some components from other components of the mixture of refractory components.

* * * * *